(12) United States Patent
Wisler et al.

(10) Patent No.: US 6,360,303 B1
(45) Date of Patent: Mar. 19, 2002

(54) PARTITIONING MEMORY SHARED BY MULTIPLE PROCESSORS OF A DISTRIBUTED PROCESSING SYSTEM

(75) Inventors: David Wisler, Cupertino; Yu-Cheung Cheung; Charles W. Johnson, both of San Jose, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/940,340

(22) Filed: Sep. 30, 1997

(51) Int. Cl.[7] .......................... G06F 12/00; G06F 12/14; G06F 12/16

(52) U.S. Cl. ...................... 711/152; 711/147; 711/153; 711/151; 711/170

(58) Field of Search .................. 711/147, 153, 711/152, 150, 151, 173, 170, 172

(56) References Cited

U.S. PATENT DOCUMENTS

| | | | | |
|---|---|---|---|---|
| 4,371,929 A | * | 2/1983 | Brann et al. ................ 364/200 |
| 5,142,676 A | * | 8/1992 | Fried et al. ................. 395/425 |
| 5,185,861 A | * | 2/1993 | Valencia ..................... 395/200 |
| 5,269,013 A | * | 12/1993 | Abramson et al. .......... 395/425 |
| 5,317,738 A | * | 5/1994 | Cochcroft, Jr. et al. ..... 395/650 |
| 5,506,987 A | * | 4/1996 | Abramson et al. .......... 395/650 |
| 5,535,116 A | * | 7/1996 | Gupta et al. ................ 364/134 |
| 5,745,778 A | * | 4/1998 | Alfieri .................... 395/800.01 |
| 5,784,697 A | * | 7/1998 | Funk et al. ................. 711/170 |
| 5,862,357 A | * | 1/1999 | Hagersten et al. .......... 395/309 |
| 5,923,847 A | * | 7/1999 | Hagersten et al. ..... 395/200.45 |
| 5,924,097 A | * | 7/1999 | Hill et al. ..................... 707/10 |
| 5,964,838 A | * | 10/1999 | Cheung et al. ............. 709/224 |

FOREIGN PATENT DOCUMENTS

EP 83302813.7 5/1983 ............. G06F/9/46

OTHER PUBLICATIONS

IBM TDB vol. 38 No. 2 "Preferential Affinity for Process Scheduling" Feb. 1995.*
IBM TDB vol. 37 No. 02A "Dispatcher Queue to Provide Processor Affinity in a Multiprocessor" Feb. 1994.*
IBM Technical Disclosure Bulletin, IBM OS/2 Extended Edition Memory Management Enhancements, vol. 32 No. 9B Feb. 1990.
Writing an Operating System/2 Application, 8204 IBM Systems Journal vol. 27 (1988) No. 2, Armonk, N.Y., U.S.A.

* cited by examiner

Primary Examiner—Do Hyun Yoo
Assistant Examiner—Kimberly McLean
(74) Attorney, Agent, or Firm—Leah Sherry; Oppenheimer, Wolff & Donnelly (57) ABSTRACT

A symmetrical processing system includes a number of processor units sharing a memory element. At least a portion of the memory element is partitioned so that separate memory partitions are made exclusively available to some if not all the processor units.

14 Claims, 3 Drawing Sheets

PARTITIONING MEMORY SHARED BY MULTIPLE PROCESSORS OF A DISTRIBUTED PROCESSING SYSTEM

BACKGROUND OF THE INVENTION

The present invention relates to computing systems in which multiple processor units share a single memory to form a distributing processing system. In particular, the invention relates to partitioning the shared memory so that each processor unit has exclusive access to an associated memory partition.

The reliance on computer systems permeates our society. As more services move on-line, continuous availability and accessibility becomes a need rather than just a luxury. One approach to meeting this need are present fault tolerant architectures structured to provide highly available, fault tolerant, and scalable systems.

Many computing systems today are structured to perform on-line transaction processing (OLTP). OLTP is found in a number of commercial applications such as, for example, financial transactions (e.g., coordinating the interchange of automated teller machines), tracking data for companies, tracking manufacturing parts (e.g., automobile parts), and many other like functions. In order to increase the number of transactions capable of being processed at any moment in time, multiple processor system architectures are used.

Among the advantageous provided by multiple processor architectures are the capability of allocating transaction functions to more than one processor unit. (A transaction may be viewed as a programmatic construct that is an explicitly delimited operation, or set of related operations, for making a change to the content of a database from one consistent state to another.) Often, a transaction may require related "services" before the transaction is completed, and a multiple processor system provides the hardware platform for executing these services in parallel, permitting the transaction to complete much faster. The second advantage is that a multiple processor architecture lends itself to providing continuous availability, i.e., fault tolerance.

Recent approaches to fault tolerant computing has been extended to include groups of individual processor units to operate as a symmetric multiprocessing (SMP) system. This approach exploits the power of multiple processor units through distribution of the operating system across the processor units that comprise the SMP system, thereby balancing the system load of the SMP configuration. In addition, an SMP configuration can reduce downtime because the operating system can continue to run on remaining processor units in the event one the processor units should fail.

A hallmark of SMP systems is that the processor units that make up the system share a single (main) memory. This can create a drag on the overall performance of the SMP system, as well as impede scalability, when multiple processes, running on the multiple processor units, desire or require memory access. For example, when a process running one of the processors of an SMP system seeks access to the shared memory at substantially the same time as another process running on another one of the processor units, memory conflicts can arise to the harm of system performance. As noted, a transaction will often require the use of a number of the services provided by parallel (or seemingly so) execution of processes running on, or available to, the SMP system. For example, a transaction to change a bank account may require, in simplistic form, a database management process to make the access and effect the change, a disk processes make the actual access to the file in which the change is to be made, and a reporting process to inform the user of the status of the change. Fault tolerance in transaction processing requires that the state of the transaction be monitored at all times, and this, in turn, necessitates one or more logs to list which processes have been called into play to execute the transaction, and the processor unit of the SMP system on which the process is executing, the state of completion of each process, and other information describing the execution of the transaction. This information and more is needed in order that a decision be made as to whether the transaction can be completed or unraveled to attempt it again should a failure of a process, a processor unit, or some other element of the system occur.

In reality, transaction processing will call into play numerous services, so that state tracking can become enormous. This, in turn, will require the processor units of the SMP system to initiate diverse memory operations, often to the same tables and/or data structures. Thus, when one processor unit has accessed a table that is needed by another processor unit, the later processor unit must wait until the earlier access is complete. When many transactions are executing on an SMP system, this waiting for memory resource can place a drag on performance.

Another drawback of the memory sharing in a SMP systems is encountered when processor units are added to the system in an effort to improve performance. Any piece of the shared memory that can be accessed by any process running on any processor unit of the SMP system can become a bottleneck if access must be mutually exclusive. Adding processor units has been found an inefficient and unsatisfactory solution because it does not attack the problem of the bottleneck. In fact, adding processor units can tend to exacerbate the bottleneck problem because now accesses to the same tables have been increased. Accordingly, something more is needed in order to be able to take full advantage of features offered by SMP architectures.

SUMMARY OF THE INVENTION

The present invention is directed to a technique that operates to alleviate the bottleneck created by shared memory SMP architectures. The invention provides a method of partitioning a shared memory so that the individual processor units of a SMP system each have exclusive use of a corresponding memory partition.

According to a preferred embodiment of the invention, each processor unit of an SMP system will continue to have shared access to an area of the shared memory element. However, a portion of the memory element is partitioned into separate memory segments, one for each of the processor units of the SMP system. The remaining portion of the memory element (i.e., that portion not allocated to the memory segments) is shared by the processor units. Accordinng to the invention there is established a memory segment address table having entries corresponding to each processor unit of the system. Next, a memory segment is allocated for each processor unit and the location address of that memory segment is written to the memory segment address table at the entry corresponding to such processor unit. Frequently accessed tables and dynamic data structures are kept in the corresponding memory partitions. When an application is first called to be executed on the system, the application is assigned to execute on one of the processor units. At that time the affinity of the process is set for the corresponding processor unit on which it first executes, allowing it access to the memory segment associated with the processor unit. Subsequent executions of the process will be on the same processor unit, permitting the process to leave in the memory segment tables and/or other data structures without fear that they will be somehow corrupted by other processes running on other processor systems. The process executing on a one of the processor units of the SMP system needing to access one of these tables/data structures will be given information identifying the location of the corresponding memory segment for the processor unit.

In a further embodiment of the invention, each memory segment has a locking mechanism that provides an executing process (actually, threads of the process) with mutual exclusive access to the memory segment to reduce conflict. A data structure associated with each locking mechanism will contain information as to the identity of the process then accessing the memory segment, if any. If no process is currently accessing the memory segment, it is available. The locking mechanism includes provision, however, of nesting accesses to the memory segment by the same thread through the use of information identifying the thread, and the number of accesses made by that thread. Thus, although other processes (or other threads of the same process) are prohibited access to the memory segment of the processor unit upon which the process is running, a particular thread, once it has obtained access, may make multiple accesses before releasing the locking mechanism.

It will be apparent to those skilled in this art that the present invention has a number of advantages. First, with each processor unit having its own memory segment, there is no longer the queuing that was attendant with prior art SMP, shared memory systems. Access to the necessary and frequently-used tables and dynamic data structures kept in the memory segments are now increased essentially four-fold (assuming a four-way SMP system, i.e., one with four processor units). With that increased access it will be evident that performance is similarly increased.

Further, the invention allows true scalability. Adding processor units, concomitant with corresponding memory segments, will truly see a corresponding increase in SMP system performance unhampered by the prior bottleneck problem.

These and other features, aspects, and advantages will become apparent upon a reading of the detailed description of the invention, which should be taken in conjunction with the accompanying drawing.

DESCRIPTION OF THE PREFERRED EMBODIMENT

Figure 1:
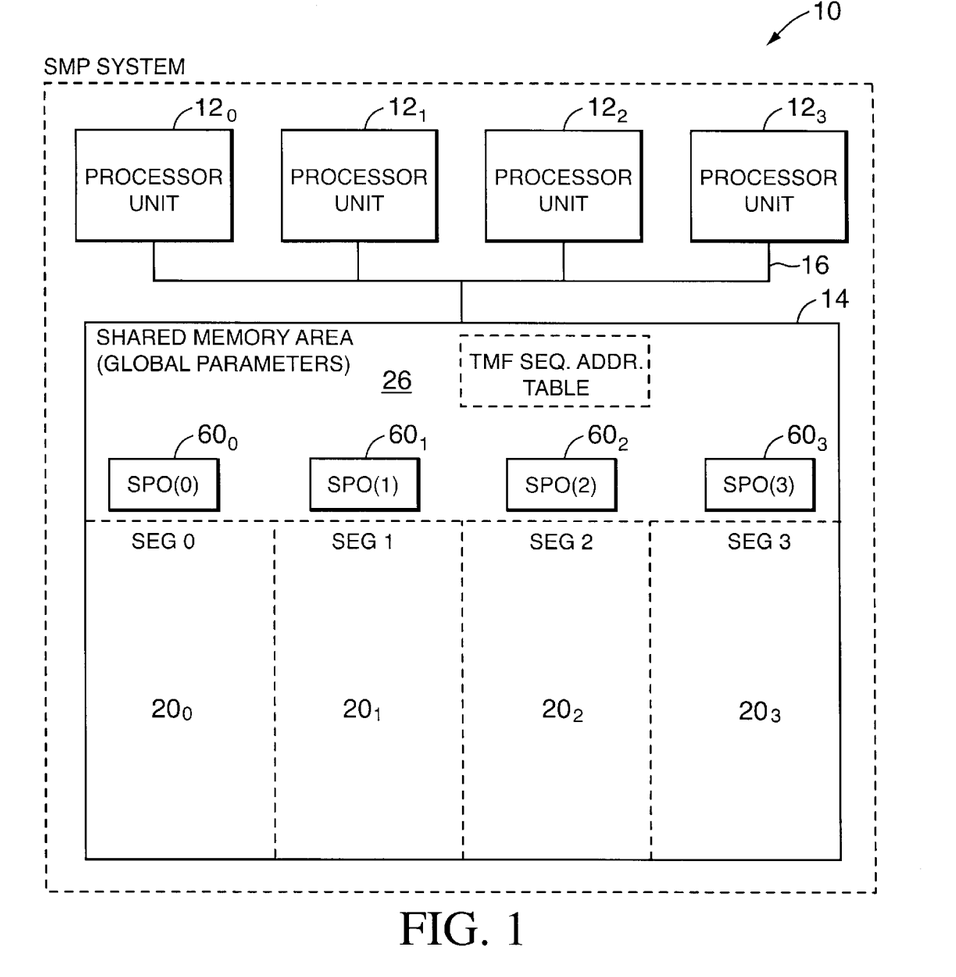
FIG. 1 is a simplified block diagram illustration of symmetrical processing system shown here, for illustrative purposes, as including four processors sharing a single memory element.

Turning now to the drawings, and for the moment specifically to FIG. 1, there is illustrated in simplified block diagram form an SMP system designated generally with the reference numeral 10. As shown, the SMP system 10 includes a number of processor units 12 ($12_0$, $12_1$, ..., $12_3$) connected to a memory element 14 that the processor units share by a bus system 16.

The SMP system 10 is structured to employ a symmetric multiprocessing operating system, Microsoft Windows NT, available from Microsoft Corporation, One Microsoft Way, Redmond, Washington (Microsoft, Windows and Windows NT are trademarks of Microsoft Corporation). At present, the Windows NT operating system is limited to being able to manage a maximum of eight (8) processor units. It is believed that future editions of the Windows NT operating system, or other operating systems, may allow increased numbers of processor units to be one SMP system. Only four processor units 12 are illustrated in order to refrain from unduly complicating the Figure.

As is conventional with the Windows NT operating system, the processor units 12 makes shared use of the memory element 14. While this is not ordinarily a significant problem, it can be in transaction processing environments. This is because in order to keep track of the various actions, services, processes, and even processor units involved in the execution of a transaction, various tables are required to be established and shared by the processor units 12. However, in order that use of those various tables be synchronized between the processor units 12, a mutex (or semaphore) is used to ensure mutually exclusive to the tables to only one process, or process thread, at any moment in time. Other processes/threads seeking access must wait their turns until the process/thread with present ownership of the table(s) has finished. And, herein is the bottleneck encountered in transaction processing systems running on symmetric multiprocessing systems such as that illustrated in FIG. 1. The actual time of memory access, including the sharing of the bus structure 16 between processor units 12, is minimal when compared to the time it takes for a process or thread to access the tables needed and used for transaction processing. (One example of the use of tables in transaction processing may be found in U.S. patent application Ser. No. 376,603 for "Tracking the State of Transactions", assigned to the assignee of the invention described and claimed herein.)

The present invention, therefore, operates to alleviate this bottleneck by partitioning a portion of the memory space provided by the memory element 14 in a number of memory segments 20 ($20_0$, $20_1$, ..., $20_3$), one each for each of the processor units 12 ($12_0$, $12_1$, ..., $12_3$, respectively) . In addition, processes have their processor unit affinity established, so that any time thereafter when the process is run, it will run on the processor unit 12 on which it was first invoked. Alternatively, an algorithm to locate a process that requires segment access to a the processor unit with the least busy memory segment. Further, access to the memory segment 20 associated with a processor 12 is ensured to be on a mutually exclusive basis as established by a locking mechanism 60 ($60_0$, $60_1$, ..., $60_3$) associated with each memory segment 20. (It should be appreciated that although the illustration of the memory segments 20 makes them appear as if they are contiguous, such is not necessarily the case in practice.).

Figure 2:
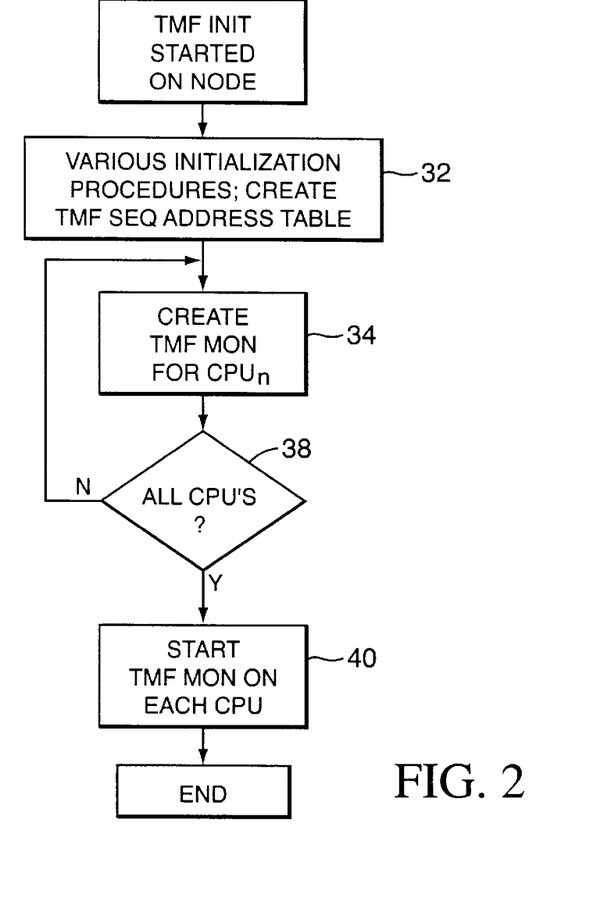
FIGS. 2 and 3 are a flow diagrams illustrating the procedure used to allocate a corresponding memory segment to each of the processor units of FIG. 1.

Turning now to FIG. 2, there broadly illustrated is an initiation process (INIT) that initializes the SMP system 10. When the SMP system is brought up, step 30 indicates that INIT is started on one of the processor units 12, leaving the remaining processor units 12 idle for the moment. INIT will go through various initialization procedures, such as setting up global tables and global variables that will be shared by all processor units 20 in a shared memory space 26 of the memory element 14 (step 32). INIT then serially creates, for each processor unit 12, a monitor process (MON; step 34). When INIT completes creation of a MON for one processor unit 12, it will move to another processor unit 12 and create a MON for it. Steps 34–38 form a loop that INIT will proceed through until each processor unit 12 of the SMP system has a MON associated with it. When the loop is complete, INIT will then start each of the MONs on each of the processor units 12.

Figure 3:
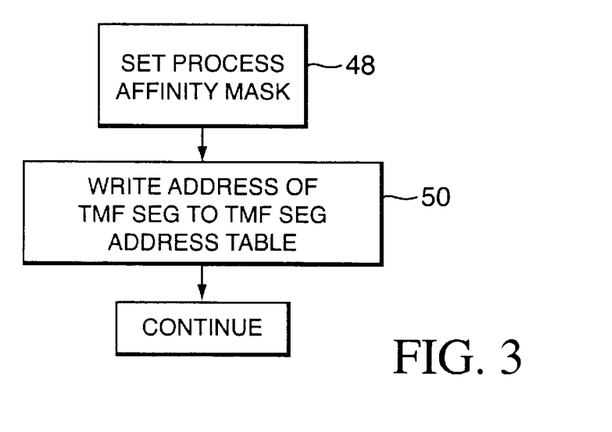

Each MON, among its other tasks not relevant here, operates to establish the memory segment 20 for its associated processor unit 12. Referring to FIG. 3, one of the first things each MON will do when started is, as step 48 of indicates, bind itself to one of the processor units of its node using the SetProcessAffinityMask function of the Windows NT operating system. Then, at step 50, the MON process will allocate a section of memory space of the memory element 14 as the memory segment 20 for the processor unit 12 for which it has established an affinity. For example, the MON executing on (and with an affinity for) processor unit $12_0$ will establish memory space for memory segment $20_0$. Next, at step 53, the MON will write the memory location of the memory segment $20_0$ the segment address table 24 in the shared memory space 26 of the memory element 14 (FIG. 1). MON will either stay resident on its associated processor, or be ready in the background as needed for its other functions. Its operation in establishing a memory segment for associated the processor 12 is complete.

Figure 4A:
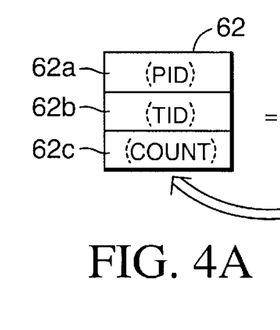
FIGS. 4a, 4b, and 4c illustrate data structures used in connection with a locking mechanism provided for each of the memory segments of each of the processor units of FIG. 1 to provide mutually exclusive access thereto.
Figure 4B:
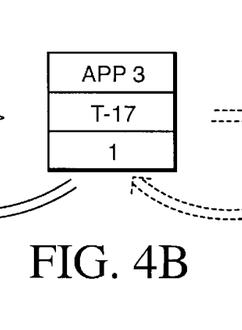
Figure 4C:
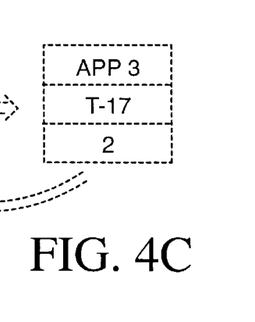

In addition, as shown in FIG. 1, a spin lock object (SPO) 60 ($60_0$, $60_1$, ..., $60_3$) together with an associated data structure 62 (FIG. 4A) is created for each memory segment 20 ($20_0$, $20_1$, ..., $20_3$, respectively). The spin lock object provides a mutual exclusive access to its associated data structure. According to the present invention, associated with each spin lock object is a data structure 62 as illustrated in FIG. 4A. MON will operate to also create the data structures 62 for each of the memory segments 20. As shown in FIG. 4a, a data structure 62 has three entries; one ($62_a$) for containing a process identification (PID), a second for containing a thread identification (TID), and the third for containing a count (COUNT). The content of the data structure will identify first if the associated SPO 60 is "owned" (i.e., that the SPO has been acquired for access to the corresponding memory segment 20), and the owner. The reasons for this will become clear when use of the SPO 60 is described below.

Figure 5:
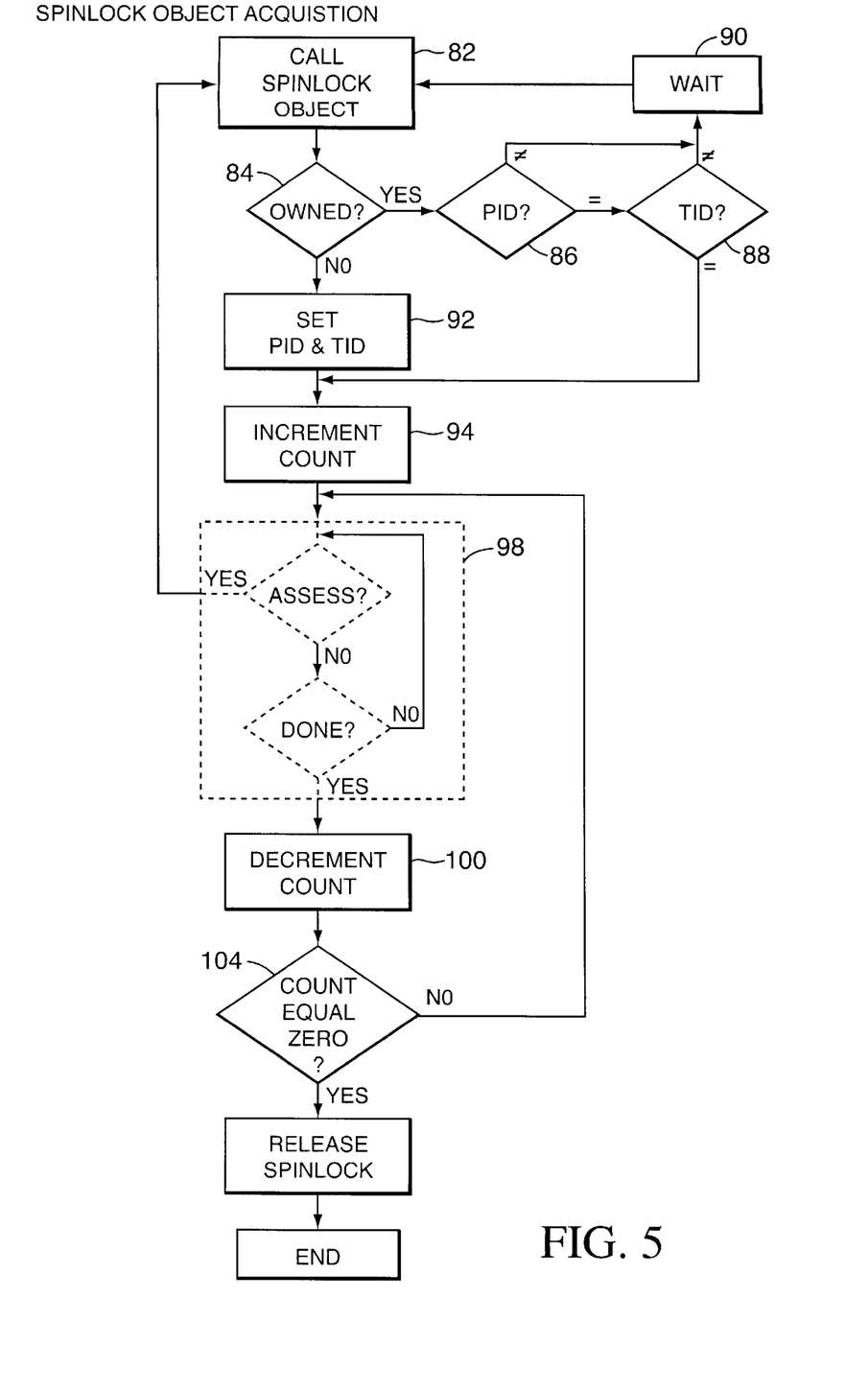
FIG. 5 illustrates the procedure for obtaining, using, and releasing access to a memory segment through the locking mechanism for a memory segment, using the data structures of the associated locking mechanism.

Turning now to FIG. 5, memory access by a process (more accurately, perhaps, a thread of a process) executing on one of the processor units 12 is made through a DLL function which will access the entry of the memory segment address table 24 FIG. 1 for the processor unit 12 to obtain the memory location of the memory segment 20 for that processor unit. At the same time, in step 82 the associated data structure 62 is retrieved the common or shared memory space 26. The data structure 20 is examined at step 84 to see if another thread has access. If the entries are empty, the spin lock object can be acquired. If the entries are not empty (steps 86 and 90; discussed further below), indicating that the spin lock object is at that moment owned, the thread/process will have to wait (step 90) until it is free.

Assume that the spin lock object 60 for the associated processor unit 20 is found to be free. The thread will acquire the spin lock object 60 at step 92 by writing the identification of the acquiring process (PID) in the entry 62a and the identity of the thread making access (TID) in the entry 62b, Next, at step 94, the COUNT, which will be zero at acquisition, is incremented to 1. The spin lock acquisition procedure will move to the block 98, where it will stay until access is finished, or if the same thread requires nested access. If the latter is the case, the spin lock acquisition procedure will return to the start, step 82, and from there to step 84 where finding that the spin lock object is owned, the procedure checks to see if the PID of the process requesting access is the same as or different from that presently owning the spin lock object. If it is not the same, the process will have to wait at step 90.

If the PID of the process seeking acquisition of the spin lock object is the same as that in entry $62_a$, a check of the TID of the thread seeking acquisition is compared to the content of the entry 62b If a match is established, the procedure moves to step 94 to increment the COUNT value in entry 62c, Of course, if the TID of the thread seeking acquisition is different, it must proceed to step 90 and wait until the present thread is through. (Step 90 is a queue that receives acquisition requests and acts upon them in a first come first served manner.) The thread again acquiring the spin lock object 60, and thereby access to the associated memory segment, proceeds to the block 98. As a thread completes its use of the memory segment, it will release its ownership of the spin lock object 60 by first decrementing the COUNT value in entry 62c of the data structure 62 (step 100), and check to see if, after being decremented, whether or not the COUNT value is now back to zero. If not, indicating that the thread still needs ownership, the procedure is returned to step 98 to again await end of the task. This progression through steps 98, 100, and 104 will continue until, in step 104, the COUNT value is found to be zero. At step 108, the ownership of the spin lock object is released by erasing the PID and TID values from the entries $62_a$ and $62_b$ of the associated data structure.

In summary, there has been disclosed a method for partitioning a portion of a memory element shared be the processor units making up an SMP system so that processes executing on any of the processor units can have mutually exclusive access to the partitioned portion corresponding to such processor unit. Although the invention has been described in environment of a Windows NT operating system, and thereby using various of the services and functions made available by and/or through that operating system, it will be evident to those skilled in this art that other operating systems (which may provide the same or different services and/or functions) can be used. Also, if the TID value can uniquely identify the thread within a node, it may be that using a PID to determine access to a data structure is redundant.

What is claimed is:

1. In a symmetrical multiprocessing system that includes a plurality of N processor units and a memory element shared by the N processor units, a method of partitioning a portion of memory to create a memory segment for each corresponding one of the N processor units so that processes executing on the N processor units have access only to the corresponding memory segment, the method including the steps of:

providing a memory segment table in the memory element accessible to the processor units, the memory segment table having, for each of the processor units, an entry;

for a particular one of the processor units, establishing a corresponding memory segment in the memory element, the memory segment having a memory address, writing said memory address to the memory segment table to identify a location in the memory element of the corresponding memory segment, starting a plurality of processes on said processor unit to establish an affinity of each said process with said processor unit, and providing said processes with the memory segment address of the corresponding memory segment to allow said processes access to the corresponding memory segment.

2. The system of claim 1 further including the step of providing each memory segment a locking mechanism that grants mutually exclusive access to such memory segment.

3. In a symmetrical multiprocessing system including a memory element having a memory space, and a plurality of processor units each being communicatively coupled with the memory element, a process of managing access to the memory element by a plurality of different processes running on associated ones of the processor units, the process comprising the steps of:

creating a segment address table in the memory space, said table including a plurality of entries;

creating and initializing a plurality of monitoring processes each binding itself to establish an affinity with an associated one of the processor units, each said monitoring process being operative to perform the sub-steps of, establishing an associated segment of the shared memory space that may be accessed by processes running on said associated processor unit, said segment having an associated memory address, and writing said memory address to an associated entry of said table;

for each of said segments, creating an associated spin lock object having an associated data structure, each said spin lock object for providing threads of processes with mutually exclusive access to said associated memory segment;

initiating a particular thread of a particular process on a particular one of the processor units, wherein an affinity is established between said particular process and said particular processor unit;

accessing an entry of said table associated with said particular processor unit to obtain a memory address of a particular memory segment associated with said particular processor unit;

determining if a particular one of the spin lock objects that is associated with said particular segment is currently free; and if said particular spin lock object is currently free, providing said particular thread with mutually exclusive access to said particular memory segment.

4. In a symmetrical multiprocessing system as recited in claim 3 wherein each said data structure associated with each said spin lock object provides for storing information indicating a process currently having mutually exclusive access to said associated memory segment.

5. In a symmetrical multiprocessing system as recited in claim 3 wherein each said data structure associated with each said spin lock object includes:

a first entry for storing a process identification value indicating a process which currently owns said spin lock object; and a second entry for storing a thread identification value indicating a thread currently accessing said memory segment associated with said spin lock object.

6. In a symmetrical multiprocessing system as recited in claim 5 wherein each said spin lock object provides for nesting accesses to said associated memory segment, and wherein each said data structure associated with each said spin lock object further includes a third entry for storing a count value indicating a number of accesses to said associated memory segment by said thread.

7. In a symmetrical multiprocessing system as recited in claim 3 wherein each said data structure associated with each said spin lock object includes a first entry for storing a process identification value indicating a process which currently owns said spin lock object, and a second entry for storing a thread identification value indicating a thread currently accessing said memory segment associated with said spin lock object, further comprising the steps of:

if said particular spin lock object is currently owned,
determining if a process identification value stored in the first entry of a particular data structure associated with said particular spin lock object identifies said particular process, if said process identification value stored in said first entry identifies said particular process, determining if a thread identification value stored in the second entry of said particular data structure identifies said particular thread.

8. In a symmetrical multiprocessing system as recited in claim 3 wherein each said data structure associated with each said spin lock object includes a first entry for storing a process identification value indicating a process which currently owns said spin lock object, a second entry for storing a thread identification value indicating a thread currently accessing said memory segment associated with said spin lock object, and a third entry for storing a count value indicating a number of accesses to said associated memory segment by said thread, the process further comprising the steps of:

if said particular spin lock object is currently owned,
determining if a process identification value stored in the first entry of a particular data structure associated with said particular spin lock object identifies said particular process, if said process identification value stored in said first entry identifies said particular process, determining if a thread identification value stored in the second entry of said particular data structure identifies said particular thread, and if said thread identification value stored in said second entry identifies said particular thread, incrementing said count value.

9. A computer readable medium having stored thereon encoding instructions for executing a process of managing access to a memory element by a plurality of different processes running on associated ones of a plurality of processor units in a symmetrical multiprocessing system, the process comprising the steps of:

creating a segment address table in the memory space, said table including a plurality of entries;

creating and initializing a plurality of monitoring processes each binding itself to establish an affinity with an associated one of the processor units, each said monitoring process being operative to perform the sub-steps of, establishing an associated segment of the shared memory space that may be accessed by processes running on said associated processor unit, said segment having an associated memory address, and writing said memory address to an associated entry of said table;

for each of said segments, creating an associated spin lock object having an associated data structure, each said spin lock object for providing a thread of an executing process with mutually exclusive access to said associated memory segment;

initiating a particular thread of a particular process on a particular one of the processor units, wherein an affinity is established between said particular process and said particular processor unit;

accessing an entry of said table associated with said particular processor unit to obtain a memory address of a particular memory segment associated with said particular processor unit;

determining if a particular one of the spin lock objects that is associated with said particular segment is currently free; and if said particular spin lock object is currently free, providing said particular thread with mutually exclusive access to said particular memory segment.

10. A computer readable medium as recited in claim 9 wherein each said data structure associated with each said spin lock object provides for storing information indicating a process currently having mutually exclusive access to said associated memory segment.

11. A computer readable medium as recited in claim 9 wherein each said data structure associated with each said spin lock object includes:

a first entry for storing a process identification value indicating a process which currently owns said spin lock object; and a second entry for storing a thread identification value indicating a thread currently accessing said memory segment associated with said spin lock object.

12. A computer readable medium as recited in claim 11 wherein each said spin lock object provides for nesting accesses to said associated memory segment, and wherein each said data structure associated with each said spin lock object further includes a third entry for storing a count value indicating a number of accesses to said associated memory segment by said thread.

13. A computer readable medium as recited in claim 9 wherein each said data structure associated with each said spin lock object includes a first entry for storing a process identification value indicating a process which currently owns said spin lock object, and a second entry for storing a thread identification value indicating a thread currently accessing said memory segment associated with said spin lock object, further comprising the steps of:

if said particular spin lock object is currently owned,
determining if a process identification value stored in the first entry of a particular data structure associated with said particular spin lock object identifies said particular process, if said process identification value stored in said first entry identifies said particular process, determining if a thread identification value stored in the second entry of said particular data structure identifies said particular thread.

14. A computer readable medium as recited in claim 9 wherein each said data structure associated with each said spin lock object includes a first entry for storing a process identification value indicating a process which currently owns said spin lock object, a second entry for storing a thread identification value indicating a thread currently accessing said memory segment associated with said spin lock object, and a third entry for storing a count value indicating a number of accesses to said associated memory segment by said thread, the process further comprising the steps of:

if said particular spin lock object is currently owned,
determining if a process identification value stored in the first entry of a particular data structure associated with said particular spin lock object identifies said particular process, if said process identification value stored in said first entry identifies said particular process, determining if a thread identification value stored in the second entry of said particular data structure identifies said particular thread, and if said thread identification value stored in said second entry identifies said particular thread, incrementing said count value.

* * * * *

UNITED STATES PATENT AND TRADEMARK OFFICE
CERTIFICATE OF CORRECTION

PATENT NO.    : 6,360,303 B1
DATED         : March 19, 2002
INVENTOR(S)   : Wisler et al.

It is certified that error appears in the above-identified patent and that said Letters Patent is hereby corrected as shown below:

<u>Title page,</u>
Item [75], Inventors, delete "Charles W. Johnson" it should read
-- Charles S. Johnson --.

<u>Column 1,</u>
Line 8, reads "form a distributing processing system. In particular, the" it should read -- form a distributed processing system. In particular, the --;
Line 27, reads "Among the advantageous provided by multiple processor" it should read -- Among the advantages provided by multiple processor --;
Line 28, "architectures are the capability of allocating transaction" it should read -- architectures is the capability of allocating transaction --;
Line 41, reads "Recent approaches to fault tolerant computing has been" it should read -- Recent approaches to fault tolerant computing have been --.
Line 50, reads "ing processor units in the event one the processor units" it should read -- ing processor units in the event one of the processor units --;
Line 67, reads "to make the access and effect the change, a disk processes" it should read -- to make the access and effect the change, a disk process --.

<u>Column 2,</u>
Line 1, reads "make the actual access to the file in which the change is to" it should read -- to make the actual access to the file in which the change is to --;
Line 25, reads "Another drawback of the memory sharing in a SMP" it should read -- Another drawback of the memory sharing in SMP --;
Line 31, reads "Adding processor units has been found an inefficient and" it should read -- Adding processor units has been found to be an inefficient and --;
Line 56, reads "According to the invention there is established a memory" it should read -- According to the invention there is established a memory --.

<u>Column 3,</u>
Line 8, reads "process executing on a one of the processor systems. The" it should read -- process executing on one of the processor systems. The --;
Line 33, reads "the memory segments are now increased essentially four-" it should read -- the memory segments are now increased essentially four- --;
Line 48, reads "FIG. 1 is a simplified block diagram illustration of sym-" it should reads -- FIG. 1 is a simplified block diagram illustration of a sym- --;
Line 52, reads "FIGS. 2 and 3 are a flow diagrams illustrating the proce-" it should read -- FIGS. 2 and 3 are flow diagrams illustrating the proce --.

UNITED STATES PATENT AND TRADEMARK OFFICE
CERTIFICATE OF CORRECTION

PATENT NO. : 6,360,303 B1
DATED : March 19, 2002
INVENTOR(S) : Wisler et al.

It is certified that error appears in the above-identified patent and that said Letters Patent is hereby corrected as shown below:

Column 4,
Line 19, reads "system, the processor units 12 makes shared use of the" it should read -- system, the processor units 12 make shared use of the --;
Line 28, reads "used to ensure mutually exclusive to the tables to only one" it should read -- used to ensure mutual exclusivity to the tables to only one --;

Column 5,
Line 14, reads "things each MON will do when started is, as step 48 of" it should read -- things each MON will do when started is, as step 48 --;
Line 22, reads "120 will establish memory space for memory segment 200" it should read -- $12_0$ will establish memory space for memory segment $20_0$ --;
Line 55, reads "data structure 62 is retrieved the common or shared memory" it should read -- data structure 62 is retrieved from the common or shared memory --;
Line 56, reads "space 26. The data structure 20 is examined at step 84 to see" it should read -- space 26. The data structure 62 is examined at step 84 to see --.

UNITED STATES PATENT AND TRADEMARK OFFICE
CERTIFICATE OF CORRECTION

PATENT NO. : 6,360,303 B1
DATED : March 19, 2002
INVENTOR(S) : Wisler et al.

It is certified that error appears in the above-identified patent and that said Letters Patent is hereby corrected as shown below:

<u>Column 6,</u>
Line 13, reads "content of the entry 62*b* If a match is established, the" it should read
-- content of the entry 62$_b$. If a match is established, the --;
Line 15, reads "in entry 62*c*. Of course, if the TID of the thread seeking" it should read -- in entry 62$_c$. Of course, if the TID of the thread seeking --;
Line 24, "the COUNT value in entry 62*c* of the data structure 62 (step" it should read -- the COUNT value in entry 62$_c$ of the data structure 62 (step --;
Line 25, reads "100), and check to see if, after being decremented, whether" it should read -- 100), and check to see if, after being decremented, --
Line 26, reads "or not the COUNT value is now back to zero. If not," it should read -- the COUNT value is now back to zero. If not --;

Signed and Sealed this

Fifteenth Day of April, 2003

JAMES E. ROGAN
*Director of the United States Patent and Trademark Office*